United States Patent
Dequeiroga et al.

(10) Patent No.: US 10,931,672 B1
(45) Date of Patent: Feb. 23, 2021

(54) CERTIFIED TRANSACTION AUTHENTICATION SYSTEM FOR UNILATERALLY-ISSUED RECORDS

(71) Applicant: DocTrace, LLC, Liberty Hill, TX (US)

(72) Inventors: Marcos V Dequeiroga, Leander, TX (US); Marcio C Esteves, Austin, TX (US); Tom Roesner, Liberty Hill, TX (US)

(73) Assignee: DocTrace, LLC, Liberty Hill, TX (US)

(*) Notice: Subject to any disclaimer, the term of this patent is extended or adjusted under 35 U.S.C. 154(b) by 0 days.

(21) Appl. No.: 16/988,148

(22) Filed: Aug. 7, 2020

(51) Int. Cl.
H04L 29/06 (2006.01)
G06F 16/23 (2019.01)

(52) U.S. Cl.
CPC ...... *H04L 63/0884* (2013.01); *G06F 16/2379* (2019.01)

(58) Field of Classification Search
CPC .......................... H04L 63/0884; G06F 16/2379
See application file for complete search history.

(56) References Cited

U.S. PATENT DOCUMENTS

| 253,464 A | 2/1882 | Woodward | |
| 8,442,917 B1 * | 5/2013 | Burke | G06Q 50/06 705/63 |
| 2009/0083372 A1 * | 3/2009 | Teppler | H04L 9/3226 709/203 |

(Continued)

FOREIGN PATENT DOCUMENTS

| WO | 2020036657 A1 | 4/2019 |
| WO | 2020036657 A1 | 2/2020 |

OTHER PUBLICATIONS

Brunner, et al., "SPROOF: A platform for issuing and verifying documents in a public blockchain," Center for Secure Energy Informatics, Salzburg University of Applied Sciences, Pouch bei Hallein, Austria. Circa 2019. Retrieved from the internet <http://openaccess.thecvf.com/content_CVPRW_2019/papers/BCMCVAI/Delgado-Mohatar_Biometric_Template_Storage_With_Blockchain_A_First_Look_Into_Cost_CVPRW_2>.

(Continued)

*Primary Examiner* — Arvin Eskandarnia
(74) *Attorney, Agent, or Firm* — Craige Thompson; Thompson Patent Law

(57) ABSTRACT

Apparatus and associated methods relate to generating persistent transaction records (PTR), each containing fields/parameters determined by a template that gets stored on a centralized blockchain to identify a certified transaction associated with a particular Certified Body and Certified Subject pair, the persistent transaction records being unilaterally issued by the Certified Body. In an illustrative example, the Certified Body may be authenticated by a trusted Certifying Transaction Authority System (CTAS) configured to authenticate parametric data from one or more Certified Bodies and cause the authenticated parameters to be stored on the blockchain in association with the Certified Subject as a PTR. The PTR may be accessible in the decentralized blockchain by, for example, the Certified Body, the Certified Subject, and an authorized 3rd Party. The CTAS may advantageously provide an automated infrastructure for unilateral issuance of trustworthy and immutable records of diverse information (e.g., credentials, experience, rights) relating to Certified Subjects.

20 Claims, 6 Drawing Sheets

(56) References Cited

U.S. PATENT DOCUMENTS

| | | | |
|---|---|---|---|
| 2013/0246257 A1* | 9/2013 | Burke | G06Q 20/102 |
| | | | 705/40 |
| 2018/0253464 A1 | 9/2018 | Kohli et al. | |
| 2020/0026801 A1* | 1/2020 | Babu | G06N 20/00 |
| 2020/0252202 A1* | 8/2020 | Madl | G06F 21/6218 |

OTHER PUBLICATIONS

Ben Whittle, "Storing Documents on the Blockchain: Why, How, and Where," published Dec. 23, 2018. Retrieved from the internet <https://coincentral.com/storing-documents-on-the-blockchain-why-how-and-where/>.

SecureLogic TrustGrid™, circa Sep. 2018. Retrieved from the internet <https://www.blockchain-council.org/blockchain/countries-to-implement-blockchain-for-digitaldrivers-license/>; <https://www.itwire.com/development/secure-logic-says-its-new-blockchainplatform-will-improve-delivery-of-government-services.html; https://securelogicgroup.com/innovation-centre/trustgrid-ecosystem/>.

Alex Zaharov-Ruett, Secure Logic says new blockchain platform will 'improve delivery of govt services', Sep. 10, 2018, <https://www.itwire.com/development/secure-logic-says-its-new-blockchain-platform-will-improve-delivery-of-government-services.htm>.

Ben Whittle, Storing Documents on the Blockchain: Why, How, and Where, Dec. 23, 2018, <https://coincentral.com/storing-documents-on-the-blockchain-why-how-and-where/>.

Bennett Garner, What is Storj? 51 Beginner's Guide,, Feb. 14, 2018, <https://coincentral.com/storj-beginners-guide/>.

Brunner, et al, SPROOF: A platform for issuing and verifying documents in a public blockchain, <https://www.en-trust.at/papers/Brunner19a.pdf>.

Delgado-Mohatar, et al, Biometric Template Storage with Blockchain: A First Look into Cost and Performance Tradeoffs, 2019, <http://openaccess.thecvf.com/content_CVPRW_2019/papers/BCMCVAI/Delgado-Mohatar_Biometric_Template_Storage_With_Blockchain_A_First_Look_Into_Cost_CVPRW_2019_paper.pdf>.

Securelogic, Secure Logic TrustGrid, What is a Digital Trust?, <https://securelogicgroup.com/innovation-centre/trustgrid-ecosystem/>.

Toshendra Kumar Sharma, Countries to Implement Blockchain for Digital Driver's License, <https://www.blockchain-council.org/blockchain/countries-to-implement-blockchain-for-digital-drivers-license/>.

Blockcerts.org, About Blockcerts, Dec. 29, 2020, <https://www.blockcerts.org/about.html>.

Blockcerts.org, FAQ—Blockcerts: The Open Standard for Blockchain Credentials, Dec. 29, 2020, <https://www.blockcerts.org/guide/faq.html>.

Blockcerts.org, Introduction—Blockcerts: The Open Standard for Blockchain Credentials, Dec. 29, 2020, <https://www.blockcerts.org/guide/>.

Durant, et al, Digital Diploma debuts at MIT, MIT News, Oct. 17, 2017, <https://news.mit.edu/2017/mit-debuts-secure-digital-diploma-using-bitcoin-blockchain-technology-1017>.

Hyland, Blockchain Security, Dec. 29, 2020, <https://www.hylandcredentials.com/benefits>.

Hyland, Digital Credentials | Hyland Credentials, Dec. 29, 2020, <https://www.hylandcredentials.com>.

Hyland, Issue Verifiable Digital Records, 2020, Ebook.

\* cited by examiner

CERTIFIED TRANSACTION AUTHENTICATION SYSTEM FOR UNILATERALLY-ISSUED RECORDS

TECHNICAL FIELD

Various embodiments relate generally to systems and methods configured to generate trustworthy persistent transaction records that may be unilaterally issued by a Certified Body.

BACKGROUND

Large volumes of information, such as professional licenses and educational diplomas, for example, can be stored in a variety of electronic and non-electronic forms. A common medium for large volume information storage is in the form of digitally encoded files on electronic data storage devices. Another conventional medium for information storage is a paper-based document, which may be printed in large volumes, for example.

Information storage may be considered either volatile or non-volatile. Non-volatile memory storage media can maintain information for long periods even after power has been removed. In contrast, information stored in volatile data storage systems is ephemeral because it may be lost, for example, when power is removed. Many paper-based documents may be considered volatile based on a limited lifetime unless, for example, expensive environmental controls are deployed to prevent degradation within a physically large storage area that include a reliable paper filing and retrieval system.

Even if reliably recorded in a storage medium, the trustworthiness of information can be an issue in a variety of circumstances. For example, a job-seeker may wish to communicate a trustworthy history of previous employment experiences. Anyone seeking professional services may wish to verify the academic and professional credentials of a doctor, a lawyer, or an engineer, for example. Those wishing to verify credentials, for example, may seek the most trustworthy information available on which to base their decisions.

One solution to validate the trustworthiness of digitally encoded information is by use of decentralized ledger, such as blockchain, for example. A blockchain accumulates records, or blocks, formed with a cryptographic hash of a preceding block, a timestamp, and the encoded information as the payload or contents of the block. Some blockchains may be designed to resist modification of the contained data by employing a distributed ledger that can record transactions in a peer-to-peer network architecture. The peers, or nodes, in the network may communicate using established protocols to verify that the recorded blocks are valid. The blockchain peers attempt to prevent unnoticed alteration of stored records by iteratively requiring consensus as to the value of the cryptographic hash of a prior block in the block chain.

SUMMARY

Apparatus and associated methods relate to generating persistent transaction records (PTR), each containing fields/parameters determined by a template that gets stored on a decentralized blockchain to identify a certified transaction associated with a particular Certified Body and Certified Subject pair, the persistent transaction records being unilaterally issued by the Certified Body. In an illustrative example, the Certified Body may be authenticated by a trusted Certifying Transaction Authority System (CTAS) configured to authenticate parametric data from one or more Certified Bodies, and cause the authenticated parameters to be stored on the blockchain in association with the Certified Subject as a PTR. The PTR may be accessible in the decentralized blockchain by, for example, the Certified Body, the Certified Subject, and an authorized 3rd Party. The CTAS may advantageously provide an automated infrastructure for unilateral issuance of trustworthy and immutable records of diverse information (e.g., credentials, experience, rights) relating to Certified Subjects.

Various embodiments may achieve one or more advantages. For example, some embodiments may be directed to systems and methods that advantageously eliminate paper and even document files (PDFs, etc. . . . ) by providing a searchable timeline of transactions and/or records sent and received to its members on a secure and immutable blockchain ledger. Processes performed by an exemplary CTAS to record a PTR in response to a Provider's unilateral message, and subsequent retrieval and delivery of the PTR in response to a request message from an Authorized Receiver, may be managed securely and in real time by the CTAS. In some embodiments, a CTAS may be configured to safely deliver the PTR, alone or in combination with its visual representation (e.g., a PDF file representation of a professional license certificate, for example), to the receiver. Various examples may have one authority granting a status or a privilege to one or more receivers in a unilateral transaction (e.g., prescriptions, diplomas, certificates, member IDs, event tickets, transportation tickets, government permits). Various implementations may record, in an immutable ledger, parameter information without the need for an entire document, which may advantageously reduce storage and bandwidth costs, for example, in each node of a blockchain.

Advantageously, the CTAS may provide an "electronic wallet" for receivers to have all of their documents on hand and they are automatically authenticated as gold source. While conventional prior art solutions may only solve the specific problem of the authenticity of documents created as digital files (PDF, DOC, TIF, CDR, etc. . . . ), various embodiments of the CTAS may advantageously provide a practical solution for receivers to have access to all PTRs via a single service that is always reachable. Some examples may substantially eliminate paper and even document files (PDFs, etc. . . . ) from storage, and may further provide a searchable timeline of benefits conferred on and by members (e.g., Certified Body providers, Certified Subjects, Authorized Receivers) who may access the CTAS.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, two illustrative use case scenarios (without and with a document representation) for recording, retrieving, and publishing persistent transaction unilaterally initiated Benefit Parameters on a block chain are briefly introduced with reference to FIGS. 1A-2. Second, with reference to FIG. 3, the discussion turns to exemplary embodiments that illustrate a cloud-based implementation of a Certified Transaction Authority System (CTAS). Finally, with reference to FIGS. 4-5, further explanatory discussion and flow charts are presented to explain improvements in software and methods for recording and retrieving benefit (e.g., access, grant) information unilaterally issued by certified bodies in parametric form (e.g., without a formatted document (e.g., PDF).

Figure 1A:
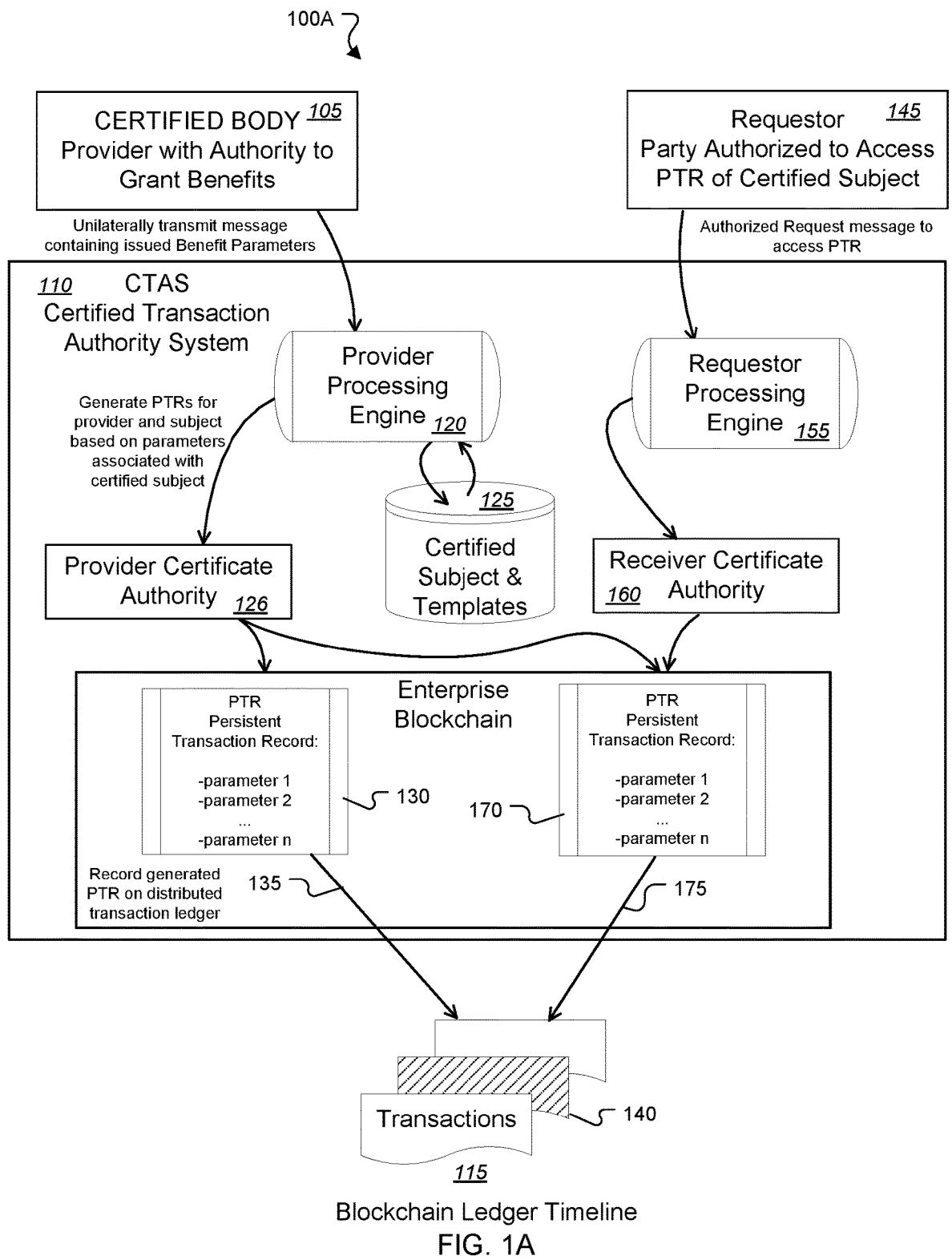
FIG. 1A depicts an exemplary process flow diagram illustrating operation of an exemplary Certified Transaction Authority System (CTAS) employed in an illustrative use-case scenario to record, in the form of a persistent transaction record (PTR) on an immutable blockchain ledger, parameters associated with a certified subject and received from a Certified Body.

FIG. 1A depicts an exemplary process flow diagram illustrating operation of an exemplary Certified Transaction Authority System (CTAS) employed in an illustrative use-case scenario to record, in the form of a persistent transaction record (PTR) on an immutable blockchain ledger, parameters associated with a certified subject and received from a Certified Body.

In the depicted use case scenario 100A, a Certified Body 105 unilaterally generates and transmits an electronic message containing issued Benefit Parameters to be conferred on a Certified Subject. The message is received by a Certified Transaction Authority System (CTAS) 110, which is configured to record the benefit parameters on a blockchain ledger timeline 115, as will be described. The CTAS 110 includes a provider processing engine 120 in operable communication with a database 125. The provider processing engine 120 may extract certified subject, benefit parameter, and transaction type information, for example, from the message. Based on the extracted certified subject and/or type information, the provider processing engine 120 may retrieve a predetermined template from the database 125, in cooperation with a Provider Certification Authority 126 service configured to control access, and then generate a Persistent Transaction Record (PTR) 130 for the provider's PTR ledger, and a PTR 170 for the receiver's PTR ledger. PTR 130 and PTR 170 may contains the benefit parameter information in association with (e.g., linked to) the Certified Subject according to the retrieved template. The CTAS 110 may then assemble the PTR 130 into electronic message 135 with an instruction to record the assembled PTRs as a block or record 140 on a distributed transaction ledger, such as the blockchain 115 ledger timeline. Accordingly, the CTAS 110 may advantageously cause the file-less benefit parameters to be immutably stored for later retrieval in a trustworthy, validated process.

For example, in some embodiments, the PTR 130 may be used to create a benefit record 140 in blockchain ledger timeline 115. PTR 130 may have a corresponding PTR 170 in the receiver's PTR ledger, created at the same time as PTR 130, and having link 175 between the benefit record 140 and the receiver PTR 170. The electronic messages may generate corresponding links between the respective PTRs in the PTR ledgers and the associated transaction(s) in the blockchain ledger timeline. In some embodiments, the receiver may be anonymous such as, for example, when a receiver has not become a member of CTAS 110. Regardless, PTR 170 may be generated and recorded on an anonymous PTR ledger. The anonymous PTR ledger may join the CTAS 110 at a later point, and the currently anonymous PTR ledger may then be matched with the receiver and transferred thereto.

In the PTR 130, benefit parameter information may be customized to provide, in various embodiments, the minimum necessary and sufficient information to define the benefit being conferred on the Certified Subject. The CTAS 110 may be configured to assemble the parameters according to a template as a file-less data structure. This may advantageously reduce bandwidth load and space requirements. By way of example and not limitation, the parameters may include: identifying information of receiver, authorized requestor, and/or Certified Subject; Expiration time/date of the benefit; issue date of the benefit; geographical region; access control information; class or rank of the benefit; or a combination of such elements. The number and type (e.g., numeric, date, text, statistics, range, exceptions, limitations) of parameter information used to define the benefit may be adapted to required circumstances according to the Certified Body, for example.

On occasion, a Requestor 145 transmits an electronic request message to retrieve for access the benefit parameter information contained in the PTR 130 stored on the blockchain 115 to be made available to an authorized Receiver. In various implementations, the CTAS 110 may functionally operate a single, large private blockchain network that contains all the transactions for all Certified Bodies and Certified Subjects. For example, some embodiments may use a commercially available multi-tenancy service platform (e.g., AWS COGNITO, which is commercially available from Amazon Web Services, Inc. with headquarters in the state of Washington) to authenticate a Requestor 145. Although all PTRs may be stored in a single blockchain, in some examples, some embodiments may provide for logical separation of the ledger into logically distinct ledgers, an example of which is described in further detail with reference to FIGS. 1B and 2.

To respond to the retrieval request message, the CTAS 110 further includes a Requestor Processing engine 155 in operable communication with the blockchain 115 through a Receiver Certification Authority 160 configured to control access. The requestor processing engine 155 may extract certified subject and transaction type information, for example, from the message. Based on the extracted information, the Receiver Certification Authority 160 may write a record to, or update a record in, the PTR 170. In response, the PTR 170 gains access to the original document or transaction 140 via an access link 175. Based on the extracted certified subject and/or type information, the requestor processing engine 155 may retrieve the PTR 130 at the block 140 from the blockchain 115, and then assemble the PTR 170 with the appropriate benefit parameters according to the detailed instructions of the request message. The CTAS 110 may then assemble the PTR 170 into an electronic message suitable for transmission to the Receiver in accordance with and responsive to the request message from the Requestor. Accordingly, the CTAS 110 may advantageously cause the file-less benefit parameters to be retrieved in real time according to a trustworthy, validated process.

For example, in some embodiments, a record 140 may be public, and any valid requestor will be immediately granted access thereto, with a corresponding PTR 170 generated and recorded. The PTR 170 may identify the user who viewed the public record, and be linked to record 140. In some embodiments, a benefit record may be private, and a Certifying Body or Certified Subject must have the right to update access control to the record 140 in order to provide access thereto to a third party. Changes to access permission, or viewing by a third party, may cause a PTR to be generated and recorded and linked to record 140.

Figure 1B:
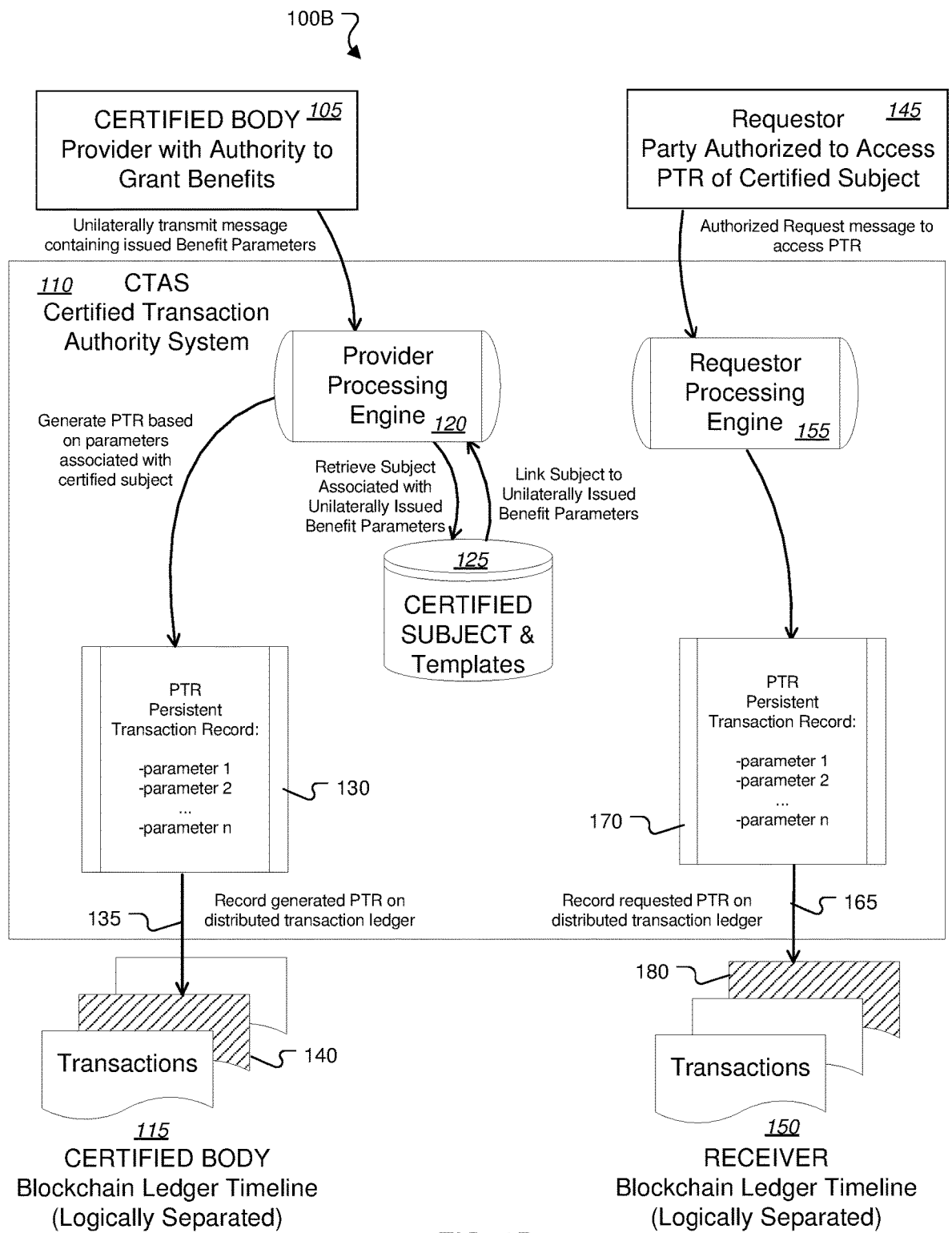
FIG. 1B depicts an exemplary process flow diagram illustrating operation of an exemplary Certified Transaction Authority System (CTAS) employed in an illustrative use-case scenario to record, in the form of a persistent transaction record (PTR) on logically separated immutable blockchain ledgers, parameters associated with a certified subject and received from a Certified Body.

FIG. 1B depicts an exemplary process flow diagram illustrating operation of an exemplary Certified Transaction Authority System (CTAS) employed in an illustrative use-case scenario to record, in the form of a persistent transaction record (PTR) on immutable blockchain ledgers, parameters associated with a certified subject and received from a Certified Body.

In the depicted use case scenario 100B, a Certified Body 105 unilaterally generates and transmits an electronic message containing issued Benefit Parameters to be conferred on a Certified Subject. The message is received by a Certified Transaction Authority System (CTAS) 110, which is configured to record the benefit parameters on a Certified Body blockchain ledger timeline 115, as will be described. The CTAS 110 includes a provider processing engine 120 in operable communication with a database 125. The provider processing engine 120 may extract certified subject, benefit parameter, and transaction type information, for example, from the message. Based on the extracted certified subject and/or type information, the provider processing engine 120 may retrieve a predetermined template from the database 125 and then generate a Persistent Transaction Record (PTR) 130 that contains the benefit parameter information in association with (e.g., linked to) the Certified Subject according to the retrieved template. The CTAS 110 may then assemble the PTR into an electronic message 135 with an instruction to record the assembled PTR as a block or record 140 on a distributed transaction ledger, such as the Certified Body blockchain 115 ledger timeline. Accordingly, the CTAS 110 may advantageously cause the file-less benefit parameters to be immutably stored for later retrieval in a trustworthy, validated process.

In the PTR 130, benefit parameter information may be customized to provide, in various embodiments, the minimum necessary and sufficient information to define the benefit being conferred on the Certified Subject. The CTAS 110 may be configured to assemble the parameters according to a template as a file-less data structure. This may advantageously reduce bandwidth load and space requirements. By way of example and not limitation, the parameters may include: identifying information of receiver, authorized requestor, and/or Certified Subject; Expiration time/date of the benefit; issue date of the benefit; geographical region; access control information; class or rank of the benefit; or a combination of such elements. The number and type (e.g., numeric, date, text, statistics, range, exceptions, limitations) of parameter information used to define the benefit may be adapted to required circumstances according to the Certified Body, for example.

On occasion, a Requestor 145 transmits an electronic request message to retrieve for access the benefit parameter information contained in the PTR 130 stored on the Certified Body blockchain 115 to be copied to a Receiver blockchain 150 ledger timeline.

To respond to the retrieval request message, the CTAS 110 further includes a Requestor Processing engine 155 in operable communication with the blockchain 115. The requestor processing engine 155 may extract certified subject and transaction type information, for example, from the message. Based on the extracted certified subject and/or type information, the requestor processing engine 155 may retrieve the PTR 130 at the block 140 from the blockchain 115, and then assemble the PTR 170 with the appropriate benefit parameters according to the detail instructions of the request message. The CTAS 110 may then assemble the PTR 170 into an electronic message 165 with an instruction to record the assembled PTR as a block or record 180 on a distributed transaction ledger, such as the Receiver blockchain 150 ledger timeline. Accordingly, the CTAS 110 may advantageously cause the file-less benefit parameters to be retrieved in real time according to a trustworthy, validated process.

In some embodiments, the blockchains 115 and 150 may be implemented as a single blockchain with logically separated access available to be configured for any of the Certified Body, Certified Subject, Requestor and receiver. By way of example and not limitation, the PTR transactions 140 and 180 on FIG. 1B may be physically stored as the same block on the same blockchain. The PTR 140,180 may be accessible by a single unique Certified Body (105) and a single unique Certified Subject. The receiver may be the Requestor, or another third party. The Requestor who may initiate the request for retrieval of the PTR from the blockchain may be the Certified Body, the Certified Subject, the Receiver, or a third party who is authorized by the Certified Body or Certified Subject. For example, the PTR 140 may be shared with other authorized users of the CTAS system. Access privileges may also be revoked by authorizing parties.

In some embodiments, logically separated blockchain ledgers, such as blockchain ledger timeline 115 and blockchain ledger timeline 150, may be synchronized with changes in other logically separated ledgers. The CTAS may be configured for example, to only synchronize changes having been endorsed by a predetermined number of CTAS members. The number of CTAS members may be, for example, a fixed number, a dynamically determined number (e.g., according to reputation of endorsing members), or be determined by individual members for their own blockchains.

In some embodiments, transactions may only be accessible through PRTs; as such, when they are shared, they are written at the PRTs of the users to whom they are shared. Such shared transactions may be revoked by the initial party who shared them, in which case, the transactions may not be retrievable by the shared party.

Figure 2:
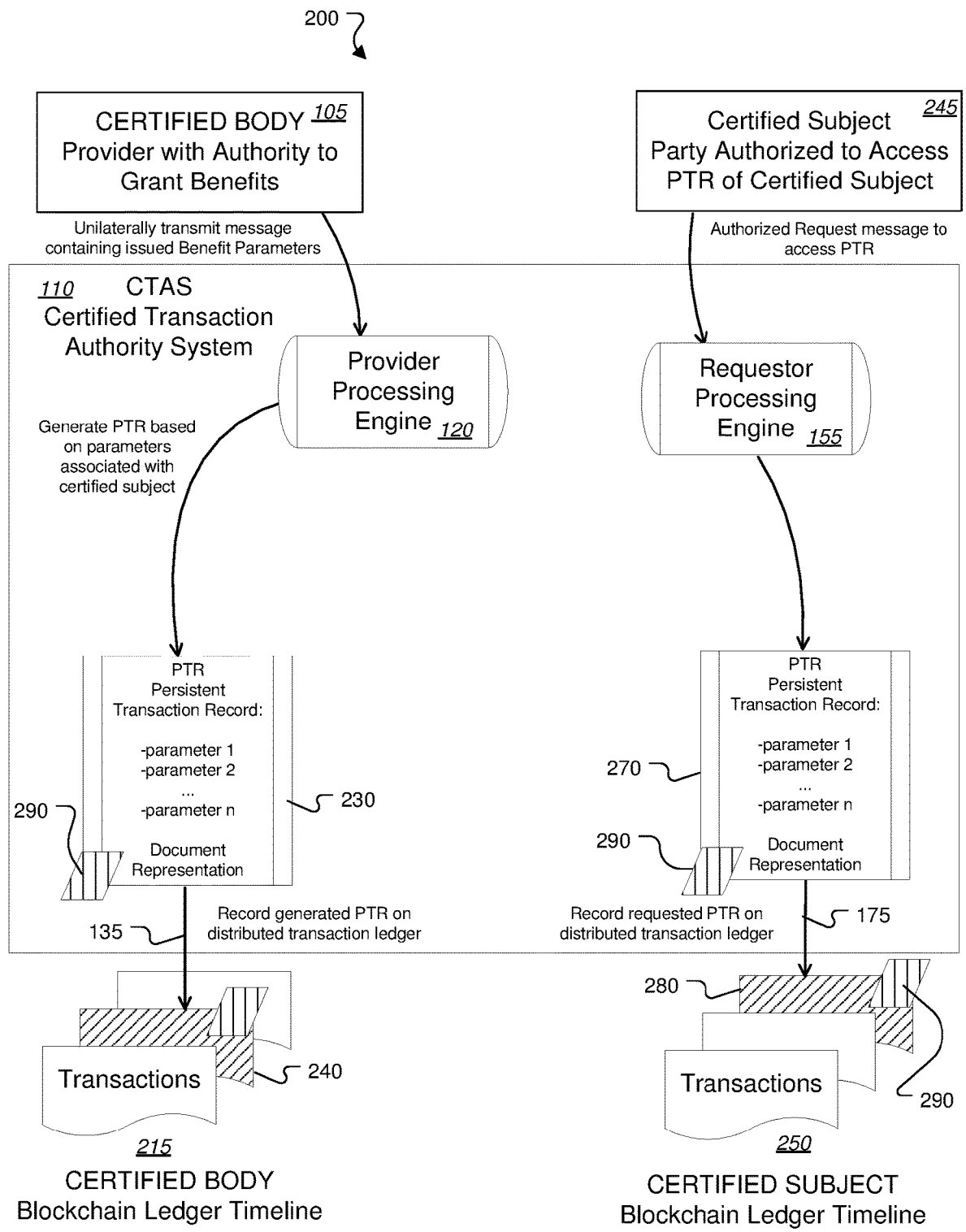
FIG. 2 depicts an exemplary process flow diagram as in FIG. 1B, further illustrating operation of an exemplary Certified Transaction Authority System (CTAS) employed in an illustrative use-case scenario to record a document representation along with the persistent transaction record (PTR).

FIG. 2 depicts an exemplary process flow diagram as in FIG. 1B, further illustrating operation of an exemplary Certified Transaction Authority System (CTAS) employed in an illustrative use-case scenario to record a document representation along with the persistent transaction record (PTR).

With respect to the embodiment of FIG. 1B, an exemplary use case scenario 200 includes the option to store for subsequent retrieval or real-time generation visual representations of the benefit parameters in the form of a formatted document. Formatted documents (e.g., PDF, .doc) may present, to a reader, a more user friendly presentation to review the benefit parameters in comparison to a file-less data structure. In the depicted example, the PTR 230 further includes the PTR 130 of FIG. 1 plus a document information 290 associated with the PTR. The document information may include one or more documents, or information sufficient (e.g., metadata) to generate a formatted document. A formatted document may include, for example, features such as text position on a page, human readable labels, font information, and the like.

In the depicted example, the authorized request message to access the PTR is initiated by the Certified Subject, who in this example stands in the shoes of the Requestor. In some examples, the Certified Subject may be an authorized party to request the CTAS 110 to retrieve one or more PTRs 140, 180 that relate a unilaterally issued benefit from the Certifying Body. In some implementations, the authorized request message to access the PTR may be initiated by a third party Certified Subject. The third party Certified Subject request may be submitted to the Certified Subject who was initially issued the PTR by the Certifying Body for review and approval, or the Certified Subject who was initially issued the PTR may pre-approve a request for at least one PTR from at least one third party Certified Subject.

In the blockchain 215, the blocks include the block 140 of FIG. 1 plus the document 290. When retrieved by the requestor processing engine 155, the PTR 270 is generated to include the PTR 170 of FIG. 1 plus the document 290. In the blockchain 250, the blocks include the block 180 of FIG. 1 plus the document 290.

Figure 3:
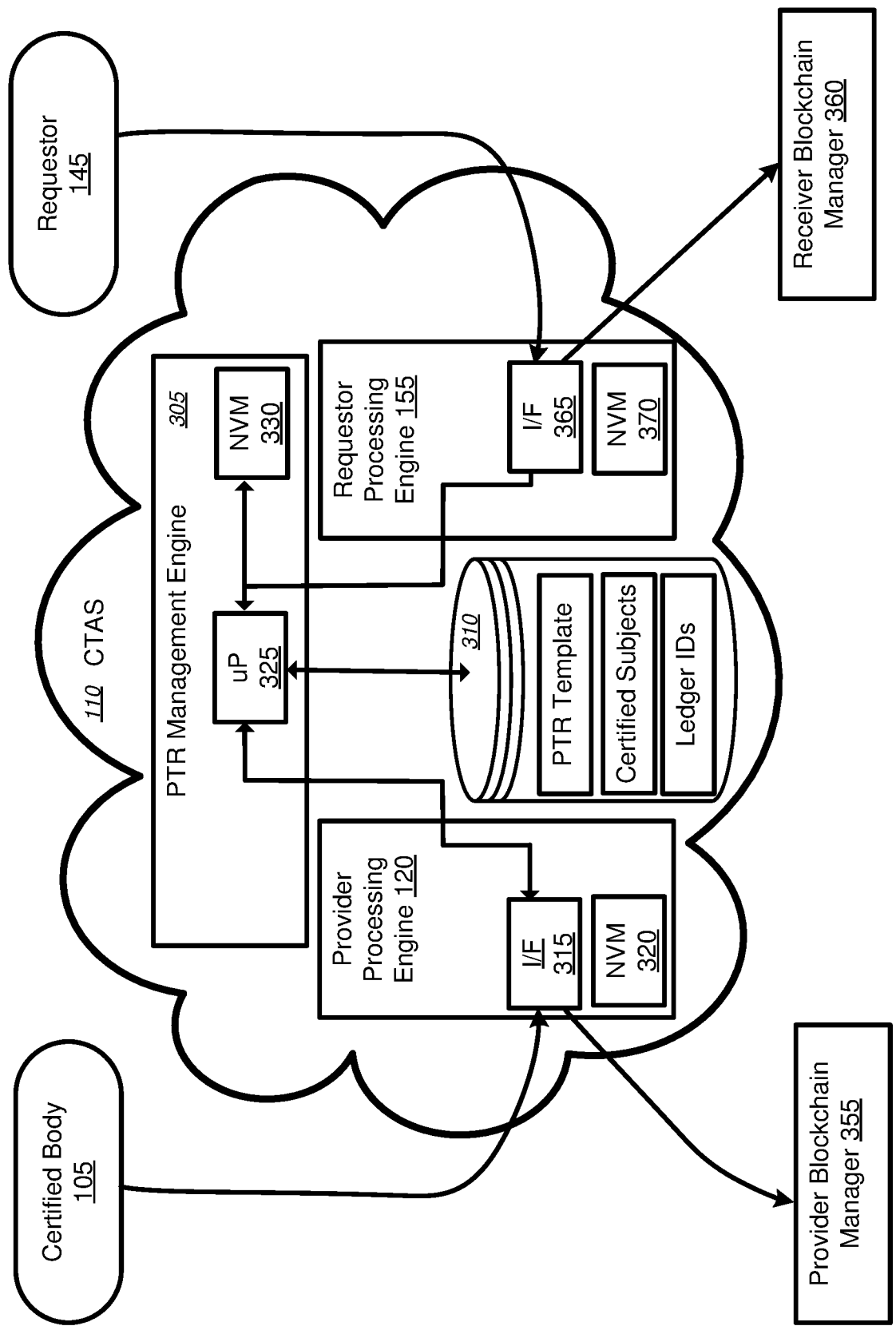
FIG. 3 depicts an exemplary system block diagram of an exemplary Certified Transaction Authority System (CTAS) configured to automatically store, retrieve, and publish a persistent transaction record (PTR) in real time.

FIG. 3 depicts an exemplary system block diagram of an exemplary Certified Transaction Authority System (CTAS) configured to automatically store, retrieve, and publish a persistent transaction record (PTR) in real time.

In the depicted figure, the CTAS 110 includes the provider processing engine 120, the receiver processing engine 155, and a PTR Management Engine 305, which cooperate with a database 310 to provide efficient storage and retrieval of unilaterally issued benefit parameters in a high trust architecture.

A Certified Body 105 communicates benefit parameter information to an interface (I/F) 315 of the provider processing engine 120. The provider processing engine 120 further includes a non-volatile memory (NVM) 320 that functions as part of the data store containing one or more modules of executable instructions. For example, the NVM 320 may contain instructions for extracting, from the received electronic message packet containing a unilateral transaction instruction from the Provider or Certified Body 105. In various examples, the extraction operations may extract benefit parameters, instructions, formatting metadata for one or more document visual and/or audio representations of the benefit, and Certified Subject identifying information, for example.

The PTR Management Engine 305 includes a processor 325 and a NVM 330 operably connected to the processor 325 and providing memory space for the data store that may contain at least some of the executable instruction modules used to operate the CTAS 110. For example, the processor 325 may access the database 310 to update, store, and retrieve, for example, PTR templates, Certified Subject information, and Ledger IDs (for addressing blockchain managers based on Certified Subject, transaction types, and/or instructions provided in an electronic message packet received by the CTAS 110.

The PTR Management Engine 305 may perform operations to supervise and manage handling of storage requests to record PTR blocks via the Provider Blockchain manager 355.

For purposes of illustration, the Provider Blockchain Manager 355 and the Receiver Blockchain Manager 360 are depicted as logical units of management of transaction records. In such embodiments, the Provider Blockchain Manager 355 may have access only to documents belonging to the certified body 105, and the Receiver Blockchain Manager 360 may have access only to transaction records accessible to the Requestor 145. In some embodiments, such as those implementing the single blockchain structure described with reference to FIG. 1A, the Provider Blockchain Manager 355 and the Receiver Blockchain Manager 360 may be arranged using common blocks on a single blockchain.

The PTR Management Engine 305 may further perform operations to supervise and manage handling of retrieval requests to copy the recorded benefit parameter information and publish user-selected benefit parameter information via the Receiver Blockchain manager 360.

In some single blockchain implementations, such as those described with reference to FIG. 1A, the PTR information and/or document may not need to be copied to transfer the retrieved PTR to a physically separate blockchain. Instead, some PTRs may be stored as a single gold source at the unique private blockchain managed by the CTAS 110. However, access to the transaction via individual PTRs may be copied as each member (certified body, requestor, $3^{rd}$ party to whom access is shared) have their own PTR governing access to the gold source transactions.

A Requestor 145 communicates requests to retrieve benefit parameter information to an interface (I/F) 365 of the requestor processing engine 155.

In some embodiments, the Certified Body may initiate the action of publishing or sending the transaction to a Certified Subject. In some embodiments, a Certified Subject (requestor) that comes to the platform looking for their transactions may first need to receive some form of invitation to access a PTR, where the invitation may be initiated exclusively by the Certified Body. In an illustrative example, University A (Certified Body) issues a diploma to student B (Certified Subject). The CTAS 110 platform may facilitate or enable University A to notify Student B (e.g., email, mobile app notification, etc.) that a new transaction was issued. Student B will need to "accept" or "reject" the transaction. Once accepted then PTR of Student B will be appended with the new transaction. The requestor processing engine 155 further includes a non-volatile memory (NVM) 370 that functions as part of the data store containing one or more modules of executable instructions. For example, the NVM 370 may contain instructions for assembling, from the received electronic message packet containing a request from the Requestor, who may be the Certified Subject in some examples. In various examples, the retrieval operations may extract, from the Requestor message, criteria for selecting a sub-set of benefit parameter stored in the retrieved PTR, document(s) 290, formatting metadata for one or more document visual and/or audio representations of the benefit, and Receiver and/or Certified Subject identifying information, for example.

Figure 4:
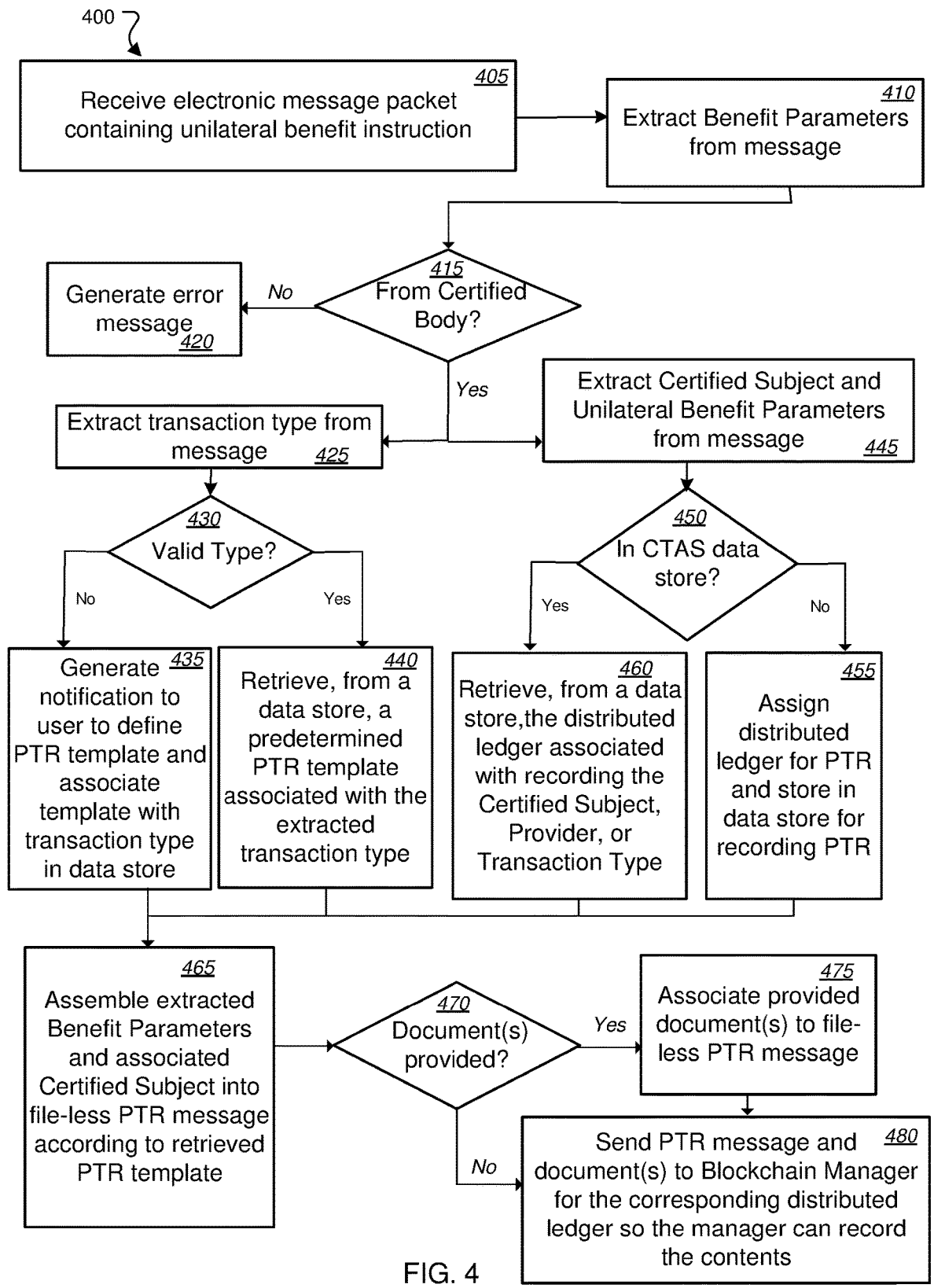
FIG. 4 depicts a process flow chart illustrating exemplary operations performed by an exemplary CTAS to record a PTR in response to a Provider's unilateral message.

FIG. 4 depicts a process flow chart illustrating exemplary operations performed by an exemplary CTAS to record a PTR in response to a Provider's unilateral message. With reference to FIG. 3, these operations may be tangibly embodied as executable instructions stored in, for example, the NVM 320 or NVM 330, taken alone or in combination.

In the depicted flowchart, a method 400 begins with the provider processing engine 120 receiving at least one electronic message packet containing a unilateral benefit instruction at 405. At 410, the CTAS 110 may extract benefit parameters from the received message at 410. At 415, a processor on the CTAS 110 may validate whether the message received at 405 is from a Certified Body. If it is not, then, at 420, the CTAS 110 generates an appropriate error message to the user or pre-programmed error handling system.

If at 415, the message received at 405 is from a Certified Body, then two operations may occur, either sequentially or substantially in parallel.

First, at 425, the CTAS 110 extracts the transaction type from the message. If at 430 the extracted type is not valid, then the CTAS 110 may generate a notification to prompt the user to define at 435 a PTR template, which the CTAS 110 may then associate with the transaction type by storing a link, for example, in the data store 310. If at 430 the extracted type is valid, then the CTAS 110 retrieves, from a data store, a predetermined PTR template associated with the extracted transaction type. Upon completion at 435, 440, control proceed to 465.

Second, at 445, the CTAS 110 extracts at least the certified subject and unilateral benefit parameters from the message. In some embodiments, further extracted information may relate to blockchain ledger identifying information, for example.

If at 450 the extracted Certified Subject is not already stored in the data store, such as the database 310, then the CTAS 110 may be configured to assign, at 455, an available distributed ledger on which to record the PTR. The CTAS 110 is further configured to store the assigned distributed ledger in the data store for future application to record similar PTRs on the assigned distributed ledger selected by the CTAS 110.

However, if at 450 the extracted Certified Subject is already stored in the data store, such as the database 310, then, at 460, the CTAS 110 may be configured to retrieve from the data store identifying information for the distributed ledger on which to record the PTR. In various examples, the identified distributed ledger information may be associated (e.g., by a link in the database) with the Certified Subject, Provider, or transaction type extracted at 425, for example.

With the PTR template determined at 435, 440 and the identified distributed ledger from 455, 460, the CTAS 110 next assembles the extracted benefit parameters and associated Certified Subject into a file-less PTR message at 465. The file-less assembly of parametric data may take the form of a data structure, or in some examples, a header or payload of a data packet, for example. The arrangement of parameter information in such a data structure may be predetermined as represented according to the defining PTR template determined at 435, 440.

At 470, the CTAS 110 determines whether any document(s), or metadata capable of being used to generate one or more documents, are provided by the Provider to be stored on the blockchain with, or in association with (e.g., linked to), the PTR to be recorded on the blockchain. In this context, such documents may provide a visual representation of the benefit parameters, in various examples. In various embodiments, the "visual representation" of the document may be considered to be, for example, similar to photocopies of original documents in the physical world. In some embodiments, the gold source is and always will be the recorded transaction. In some implementations, some "visual representations" may, for example, not be considered legally enforceable documents in the sense that they may be treated as a machine-generated photocopy that represents the contents stored in the file-less PTR parameters.

If documents are provided, then at 475, the CTAS 110 associates (e.g., by appending, linking or other assembly process) the provided document(s) to the file-less PTR message. Next, or if no documents are provided, then at 480, the CTAS 110 sends the PTR message and any associated documents (if any) to the blockchain manager for the distributed ledger determined at 455, 460 so that the blockchain manager can record the contents securely on the corresponding distributed ledger.

Figure 5:
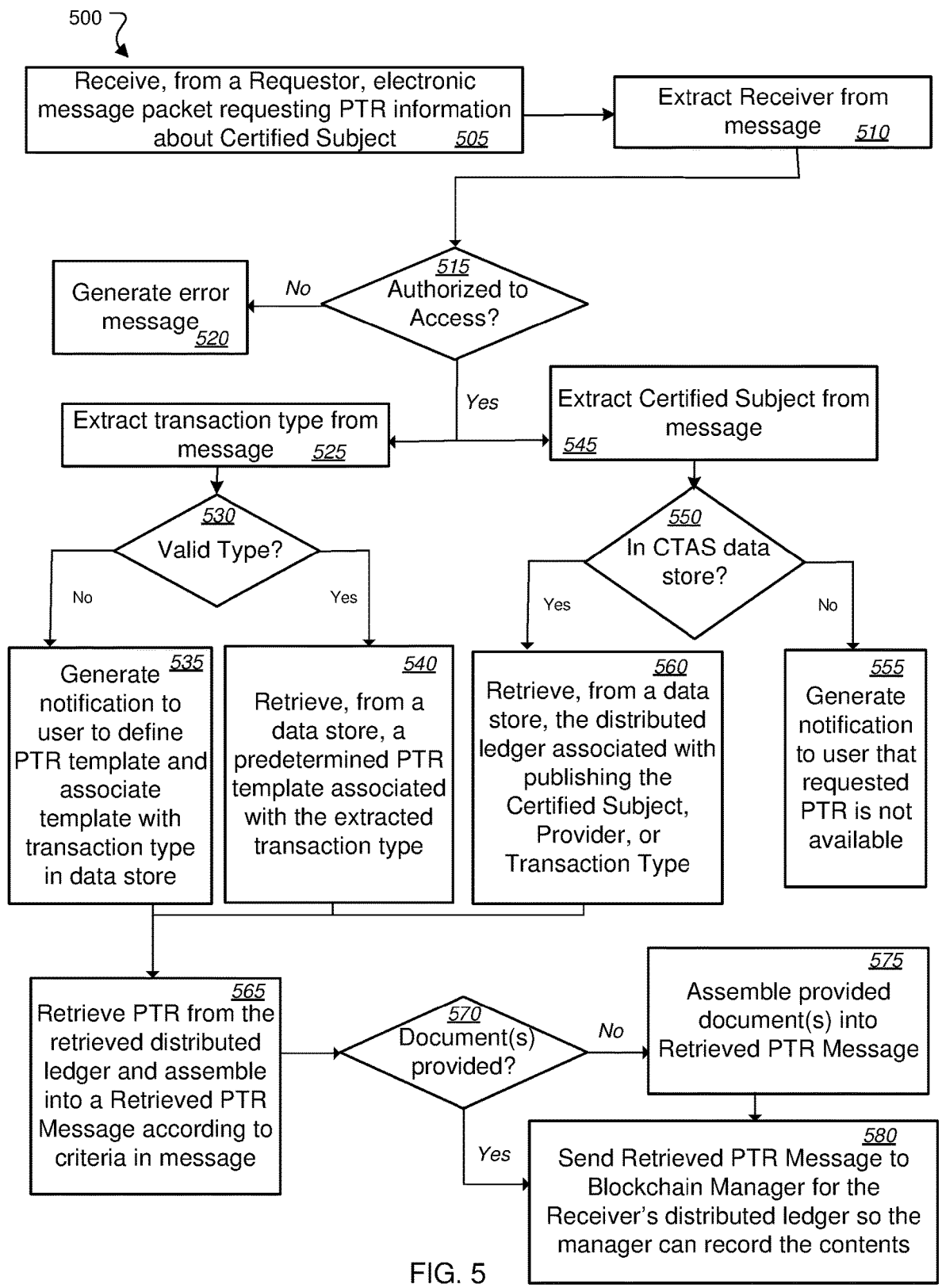
FIG. 5 depicts a process flow chart illustrating exemplary operations performed by an exemplary CTAS to retrieve and publish a PTR in response a request message from an Authorized Receiver.

FIG. 5 depicts a process flow chart illustrating exemplary operations performed by an exemplary CTAS to retrieve and publish a PTR in response a request message from an Authorized Receiver. With reference to FIG. 3, these operations may be tangibly embodied as executable instructions stored in, for example, the NVM 370 or NVM 330, taken alone or in combination.

In the depicted flowchart, a method 500 begins with the requestor processing engine 155 receiving, from a Requestor, at least one electronic message packet containing a retrieval instruction requesting PTR information about a Certified Subject, for example, at 505.

In various implementations, the act of sharing and sending the PTR may be required to originate, at least in the first instance, exclusively from the Provider or Certified Body. In such implementations, the receiver will react to that shared message, e.g., by clicking a link on an email or responding to a request at their mobile app, which may then trigger the process 500.

At 510, the CTAS 110 may extract Receiver identifying information from the received message at 510. At 515, a processor on the CTAS 110 may validate whether the message received at 505 is from a Requestor who is authorized to access the requested information pertaining to the Certified Subject. If it is not, then, at 520, the CTAS 110 generates an appropriate error message to the user or pre-programmed error handling system.

If at 515, the message received at 505 is from a Requestor who is authorized to access the requested information, then two operations may occur, either sequentially or substantially in parallel.

First, at 525, the CTAS 110 extracts the transaction type from the message. If at 530 the extracted type is not valid, then the CTAS 110 may generate a notification to prompt the user to define at 535 a PTR template, which the CTAS 110 may then associate with the transaction type by storing a link, for example, in the data store 310. If at 530 the extracted type is valid, then the CTAS 110 retrieves, from a data store, a predetermined PTR template associated with the extracted transaction type. Upon completion at 535, 540, control proceed to 565.

Second, at 545, the CTAS 110 extracts at least the Certified Subject from the message. In some embodiments, further extracted information may relate to blockchain ledger identifying information, for example.

If at 550 the extracted Certified Subject is not already stored in the data store, such as the database 310, then the CTAS 110 may be configured to generate, at 555, a notification to the user that the requested information is not available.

However, if at 550 the extracted Certified Subject is already stored in the data store, such as the database 310, then, at 560, the CTAS 110 may be configured to retrieve from the data store identifying information for the distributed ledger on which the PTR is recorded. In some embodiments, at 560, the process may further include an extra security check to make sure the receiver that initiated the request (e.g., by clicking on a message or alert sent by the provider) will match the certified subject that's in the message (545). In various examples, the identified distributed ledger information may be associated (e.g., by a link in the database) with the Certified Subject, Provider, or transaction type extracted at 525, for example.

With the PTR template determined at 535, 540 and the identified distributed ledger from 560, the CTAS 110 next retrieves the PTR from the identified distribution ledger at 565. In addition, the CTAS 110 may filter the retrieved PTR information to select only those benefit parameters that meet predetermined criteria that were optionally included in the message received at 505. The file-less assembly of parametric data may take the form of a data structure, or in some examples, a header or payload of a data packet, for example. In various embodiments, these parameters may be data elements sufficient to convey the status, privilege, achievement, attestation or entitlement to the receiver. The arrangement of parameter information in such a data structure may be predetermined as represented according to the defining PTR template determined at 535, 540.

At 570, the CTAS 110 determines whether any document(s), or metadata capable of being used to generate one or more documents, are associated with the PTR and requested by the Requestor to be retrieved from the blockchain. In this context, such documents may provide a visual representation of the benefit parameters, in various examples. If documents are provided, then at 575, the CTAS 110 associates (e.g., by appending, linking or other assembly process) the provided document(s) to the file-less retrieved PTR message. Next, or if no documents are provided, then at 580, the CTAS 110 sends the retrieved PTR message and associated documents (if any) to the blockchain manager for the distributed ledger determined at 560 so that the blockchain manager can record the contents securely on the corresponding distributed ledger.

Although various embodiments have been described with reference to the figures, other embodiments are possible. For example, in some embodiments, a persistent transaction record (PTR) may be defined by a set of parameters stored on the blockchain for real-time retrieval. The stored parameters may be issued unilaterally by a Certified Body having predetermined certification from a trusted CTAS. The stored parameters may indicate a particular transaction. In some implementations the transaction record may describe, by way of example and not limitation, proof of right, benefit, privilege, or achievement. The transaction record may be issued under the exclusive control and direction of the Certified Body. The CTAS may receive from the Certified Body, one or more digitally encoded packets of information. The encoded packets may include a payload and/or metadata information representing contents of the PTR, or at least some of the parameters associated with the PTR. For example, the received packet information may include updates to a PTR previously recorded on the blockchain.

The CTAS may, in some implementations, digitally authenticate the received information to verify its trustworthiness and accuracy. Once the parameters for the PTR have been authenticated, the CTAS may then cause the PTR to be entered on the blockchain as a record associated with a Certified Subject to which the transaction record pertains.

In various implementations, the foregoing example may include unilateral issuance by the Certified Body. In response to the issuance by the Certified Body, the CTAS may automatically perform authentication, association of the parameters with the Certified Subject, and instantiation on the Block Chain. In this connection, unilateral issue of the PTR and instantiation on the block chain are performed independently with respect to intervention by the Certified Subject. Various embodiments of the methods may be performed exclusive of any action or input by the Certified Subject.

In an illustrative example, the CTAS may receive, from any of a plurality of Certified Bodies, electronic messages containing parametric information relating to one of a plurality of Certified Subjects. The Certified Body (e.g., educational institution) may issue the parametric information in response to one or more trigger conditions being satisfied. For example, a trigger condition may be satisfied upon a Certified Subject (e.g., student) meeting all of the predetermined criteria for completing a curriculum for a course of study that is monitored by the Certified Body (e.g., either directly, or through an agent). Accordingly, the CTA may associate, in some examples, the Certified Subject with the parametric information, and cause the associated information to be entered on the block chain as a Persistent Transaction Record (PTR). The PTR may represent a trustworthy and immutable record of the Certified Subject's achievement of a predetermined degree or certification based on the course of study.

For example, various implementations may be directed to systems and methods that advantageously eliminate paper and even document files (PDFs, etc. . . . ) by providing a searchable timeline of documents sent and received to its members on a secure and immutable blockchain ledger.

The CTAS, in some embodiments, may be governed by a Certifying Transaction authority. The CTAS is the highest authority in the system, as this Authority owns the infrastructure and manages the entire system. In various implementations, some or all of the blockchains may be externally operated outside of, but responsive to instructions (e.g., record, retrieve records) from, the CTAS. There are several blockchains in the world. Each blockchain is established in a private and protected network so that only allowed players participate. In some embodiments in accordance with the methods and apparatus described herein, the CTAS 110 may include one single private and protected blockchain. Each member (e.g., provider or receiver) may be added to the blockchain managed by the CTAS. Each added member may receive a dedicated PTR. In some implementations, all the encrypted and secured transactions (documents) may be stored in a single blockchain/network. The Certifying Transaction Authority certifies transaction authorities by operating as an institution that validates the authenticity of a transaction through blockchain technology and through validation of the identity of a Certified Subject and Certifying Body. The Certifying Transaction Authority System (CTAS) may issue persistent transaction records including fields/parameters representative of a certified transaction between a Certifying Body and a Certified Subject. The Certifying Body (e.g., a university, trade school, prescribing doctor, etc.) is an organization or entity that grants a certification or other status to the Certified Subject. The Certified Subject (e.g., a graduate, doctor, pharmacy prescription holder, etc.) is a person or organization being certified by the Certifying Body.

A persistent transaction record (PTR) may be defined by a set of fields/parameters, the fields/parameters being stored on the blockchain. A persistent transaction record signifies the exclusive and unilateral grant of one or more benefits such as a privilege, status or accomplishment. In some examples, the Certifying Body (e.g., a state bar association) may have an exclusive right to grant the benefits (e.g., license to practice law in the state) it confers on a Certified Subject (e.g., an attorney). Put another way, a persistent transaction record is associated with the exclusive intent of granting a privilege, status or accomplishment that would otherwise require a document (whether written and signed or electronic). The fields/parameters of each persistent transaction record are configured for real-time retrieval by the Certifying Body, the Certified Subject, and/or a Third Party Receiver to which the persistent transaction record has been shared (either by authorization from the Certifying Body or the Certifying Subject). Some embodiments are configured such that only the Certified Subject may permit sharing a record, and a Certifying Party or Third Party Receiver may not permit sharing of a PTR without the Certified Subject(s) permission. The Third Party (e.g., a potential employer, a client, a pharmacy, etc.) may be person or organization requesting the certified transaction between the Certifying Body and the Certified Subject. The Third Party could also be defined as an entity with which the Certified Subject or Certifying Body has "shared" the certified transaction record.

In some embodiments, the sharing can be revoked. For example, a Certified Subject (Requestor) may share academic transactions with a potential employer (Receiver), but then revokes the access after the relationship with the potential employer is no longer held (e.g., the candidate was not selected and moves on to other potential employers).

The fields/parameters included in the persistent transaction records are determined by a Certifying Body to a Certified Subject. The collection of fields/parameters may be defined as templates. Once the Certifying Body is ready to certify something, it will publish a persistent transaction record by selecting (or predefining) a template, filling out the fields/parameters of the template, and then publishing the persistent transaction record to the block chain in association with information that identifies or is linked to the Certified Subject. Templates may be created by a Certifying Body (e.g., a diploma template created by a university) and populated when the Certifying Body needs to bestow a certification to a Certified Subject (who may be a graduate of the university, for example). The Certified Subject may have a mobile application with a virtual wallet of persistent transaction records, which may advantageously replace conventional wallets used to store and retrieve documents formed on non-electronic media (e.g., paper or plastic documents).

By way of example, and not limitation, Certified Transaction Records may include: e-Certificate (for transactions that represent certificates like professional assessments); e-Achievement (for transactions that represent achievements or accomplishments); e-Privilege (for transactions that represent a privilege like "access to VIP area" or other privileges); e-Ticket (for transactions that grant entrance to an event or plane/bus ride); e-Membership (for transactions that represent membership); e-Prescription; e-Note (for doctor's note authorizing absence of work, etc. . . . ); e-Diploma; e-Transcript; e-Permit; and, e-License.

CTAS, in various implementations, may record parameters at the block-chain ledger without the need for a conventionally formatted file. In fact, files are optional and, in some cases, may not be used unless a visual representation of the document is desired as these visual representations are not the gold source information. In some implementations, the PTR is stripped down to the minimum necessary and sufficient information, in a digital representation and structured according to a parametric template, to represent the unique information associated with the Certified Subject and/or the benefit being conferred. Examples of common information that be substantially eliminated or removed may include general information that is not specific to the Certified Subject. Format information used to generate a user-friendly human readable document, for example, is excluded from the parameter information recorded in the PTR. Accordingly, various types of PTR will not require a PDF, for example; rather, they may include parameter data (e.g., parameter data that describes a transaction that triggered the Certified Body to unilaterally issue the benefit being conferred).

Example: Washington county unilaterally sends a transaction record request to the CTAS. The transaction record request represents issuance of a permit to a Certified Subject, or Receiver, to build a home with certain characteristics and limitations at an exemplary address: 1234 Main Street. The transaction record for this event may include parameters that are a minimally necessary and sufficient set of parametric data that describes the substantive content of the permit rather than a formatted document in the form a PDF or a file, for example. In response to receipt of the parametric data from the Certified Body, the CTAS may perform operations to record the parametric data, in association with the Certified Subject. The CTAS may enter or cause to be entered on a blockchain, the recorded parametric data in the form of, for example, metadata attributes in a block-chain transaction, which may be referred to herein as a persistent transaction record (PTR). The CTAS may further be configured to provide for future retrieval of the PTR by entities who request access to check if the Certified Subject has a permit to build at 1234 Main Street. Such third party access may be requested or authorized by the Certified Subject, for example. The Certified Subject may optionally share that PTR to a third party as a transaction generated on a certain date, issued by Washington County. By way of example, and not limitation, some metadata parameters may include valid from/through (e.g., expiration dates). For example, a civil engineer receives a permit to exercise the profession on a given state on a given year (from Jan. 1, 2021 to Dec. 31, 2021). In this case the CTAS 110 platform may be configured to determine if a current date is past an expiration date and to present, for example, a "watermark" EXPIRED after the expiration date in the visual document or when metadata is retrieved at the app.

In various examples, the CTAS may provide for a decentralized repository for validated and trustworthy transaction records. Some embodiments include a CTAS that may receive, from a Certified Body provider, unilaterally issued parametric data defining a benefit or transaction. The received parametric information may serve as a gold source copy of the transaction. The CTAS may be responsible to archive and maintain the gold source of the transaction on both a provider and/or a receiver's ledger. In such examples, further validation may advantageously not be required as the very fact that the electronic document exists as a PTR managed by the CTAS may be sufficient proof of the recorded transaction's authenticity.

In some CTAS implementations, only one authority is granting a status or a privilege to one or more receivers. In various examples, one new status/privilege may be issued per Receiver. In some implementations, a 1:1 correspondence may be maintained such that if the same status needs to be granted to multiple receivers, then multiple transactions will need to be issued. Unlike conventional systems that rely on bilateral (e.g., contracts) transactions, various embodiments described herein may operate independently from any action or input from the Certified Subject. Applications that may be served by unilateral operations, include, but are not limited to, prescriptions, diplomas, certificates, member IDs, event tickets, transportation tickets, government permits). In some CTAS, the PTR is not a file (e.g., PDF) but a digital record transaction shared with both parties and living in their timeline.

In various embodiments, CTAS may solve a range of specific technical problems. For example, receivers, each of whom may be individuals, companies or entities (e.g., government agencies) who serve as a Certified Subject, may have some or substantially all their electronic documents recorded at a personal ledger and available via the CTAS-generated blockchain and available via their mobile app and website. Providers, each of whom may be companies or entities (e.g., government agencies) who serve as a Certified Body, who may have their electronic documents recorded at their ledger and will be able to search for all documents created and posted through a CTAS. In some implementations, parameters and associated visual representations thereof (e.g., in the form of documents) may be considered as authenticated and gold source by definition when provided by a Certified Body.

In some embodiments, a CTAS may be configured to safely deliver the PTR along with its visual representation (e.g., a PDF file representation of a professional license certificate, for example), to the receiver. The CTAS may further place that delivery transaction into both ledgers. Even though the gold source (transaction) is unique and placed into the unique CTAS blockchain the ledgers (PTR) are multiple. Each member provider/receiver gets one. Transactions can only be accessed through ledgers providing the multi-tenancy needs.

In an illustrative example, even though the CTAS may have a single Blockchain (e.g., the block 140 is unique on FIG. 1A) there may be multiple ledgers (PTRs). Each member of the CTAS may be provided with a copy of the single Blockchain, which may be compared to other copies and used to determine authenticity of one or more copies of the single Blockchain. Each member of the CTAS may be given their unique PTR, resulting in multiple PTRs according, for example, to the number of users. Each CTAS member (e.g., providers, receivers or 3rd parties) may be assigned a unique PTR (ledger). Accordingly, with reference to FIG. 1A, the blockchain 115 may have multiple PTRs (130 and 170), and each PTR may be "unique" to qualify the document stored on a block 140 of the unique blockchain 115, for example.

Multi-tenancy may be used to describe storage of data belonging to multiple tenants (e.g., who may be providers, receivers, 3rd parties) into the same storage (e.g., single blockchain). The multi-tenancy platform may enforce segregation of data in such a way that although all transactions are stored in the same blockchain, they are only accessible by the tenants to which they belong.

With reference to FIG. 1A, the single blockchain ledger timeline 115 with single instances of the documents/transactions (e.g., in the block 140). The block 140 is uniquely stored into the blockchain along with all other documents/transactions. The PTRs may provide an advantageous mechanism for operatively controlling which tenant (e.g., provider, receiver, 3rd party) can access which document/transaction.

The CTAS may be configured to permit documents to be found and accessed only through the PTRs and the PTRs may operatively act as the certificate authorities that enforce this multi-tenancy system by ensuring documents/transactions are only visible and available to the correct users through their PTRs.

In an exemplary aspect, a Certified transaction authority system (CTAS) may generate transaction records containing parameters that get stored on the blockchain to identify a transaction associated with a particular Subject. In some examples, the PTRs may be retrievable via the CTAS in substantially real time in response to a request from a requestor, who may be the Certified Subject or an authorized third party (e.g., party other than the Certified Subject). In some implementations, the CTAS 110 platform may not allow Certified Subjects or third parties to request PTR information to be added to the blockchain, but instead may exclusively allow providers to unilaterally "issue" a transaction against a single subject or subjects to share their transactions with a third party. This share will send the encryption information needed from the one with the authority to issue (provider) or share (subject) to the one who will then take action to "request" by acting upon the encrypted information. The receivers cannot initiate this process as only the providers/senders have the unilateral authority to issue or share.

In some embodiments, the certified subject may share an authorization message (e.g., token) to access data with the requestor. Then, the requestor may click the link with the encrypted token that proves the certified subject has granted that access.

Various embodiments may relate to an Authority, or Certified Body, to have recorded on the block chain via the CTAS, information representing that the Certified Body has unilaterally taken action to confer some specific benefit in favor of the Receiver, or Certified Subject. By way of example and not limitation, the conferred benefit may involve one or more of a right, privilege, status, or proof. In some embodiments, the Certified Body may send parameter information configured to record a unilateral grant of a predetermined benefit that is conferred on the Subject. For example, the predetermined benefit may relate to a train ticket from a railroad company (Certified Body) to travel benefits, such as access to preferred seating.

In some embodiments, the Certified Body may send parameter information configured to record a unilateral grant of a predetermined right that is conferred on the Subject. For example, the predetermined right may relate to a prescription from a doctor (Certified Body) to legally purchase prescription medication from a pharmacy. In another example, the predetermined right may relate to a concert ticket from a promotion company (Certified Body) that confers on the Subject the right to enter the gates during a certain time period for the purpose of attending an event.

In some embodiments, the Certified Body may send parameter information configured to record a unilateral grant of a predetermined privilege that is conferred on the Subject. For example, the predetermined privilege may relate to the right to publicly use a certain regulated title, such as "Medical Doctor" or "Professional Engineer."

In some embodiments, the Certified Body may send parameter information configured to record a unilateral grant of a predetermined status that is conferred on the Subject. For example, the predetermined status may relate to an authorized access level or an authority to take a certain action on behalf of an entity (e.g., power of attorney).

In some embodiments, the Certified Body may send parameter information configured to record a unilateral grant of a predetermined proof (e.g., or other benefit) that is conferred on the Subject. For example, the predetermined proof may relate to a notary seal being applied to show proof of, for example, the identity of a person executing an instrument.

In some embodiments. the Provider and/or Receiver immutable ledgers (e.g., block chains) may be established, using appropriately distributed nodes, by the CTAS. In such cases, the CTAS may establish a network of dedicated nodes on which to replicate PTRs on the blockchain. The blockchain may be considered to be unique, and access to the PTR parameter information may be controlled by the CTAS with reference to the PTRs, which are specifically built for the immutable ledger information dedicated for the Certified Bodies, Certified Subjects, and Authorized Receivers that access the CTAS.

In some implementations, the CTAS may record PTR information (from Providers) and publish PTR information (to Authorized Receivers) to corresponding pre-existing blockchains. for any or each of the Certified Bodies, Certified Subjects, and Authorized Receivers that are served by the CTAS. Access information for each predetermined blockchain may be stored, for example, in a database in the CTAS. In response to receiving an electronic message to initiate recordation of a new PTR, the CTAS may retrieve the correct blockchain identification information in order to build, for example, an electronic packet to transmit to the corresponding blockchain manager who will enter the PTR into the appropriate location on the blockchain ledger in each node of the correct blockchain. In some embodiments, the correct blockchain may be a centralized world state.

In some embodiments, one or more of the blockchain transactions may be made public. For example, a university may, at the option of a student, unilaterally instruct the CTAS to store parameters describing certain portions of the student's academic record (e.g., degree earned information) onto a public blockchain accessible by, for example, employers. Meanwhile, in some implementations, the university may unilaterally grant, on behalf of the student, detailed grade information for specific coursework, and send an instruction message to the CTAS to store that information on a private blockchain that requires specified permission (e.g., authorization from the student). Access control parameters (e.g., identity of persons who may authorize publication of the PTR) may be stored in association with a PTR, for example, in a database in the CTAS, and/or as metadata stored directly in the blockchain along with the corresponding PTR parameters.

In some embodiments, the visual representation(s) (e.g., a formatted diploma) generated by the CTAS 110 platform may further include a barcode (e.g., QR code). If generated by the CTAS 110, the bar code may advantageously indicate a machine-readable unique ID of the gold source transaction as recorded in the single blockchain. This bar code can be used, for example, at the point of validation (e.g., pharmacy, event door, plane boarding) to be scanned and to provide the authority scanning the proof of purchase or other benefit grant.

In some embodiments, the Certified Subject and Certifying Body may each be provided with unique private ledgers, and each be provided with a copy of a single, common, Blockchain ledger. The single Blockchain ledger may be a 'world state' ledger, which may, for example, be implemented as a database storing current values of one or more sets of ledger states. The world state ledger may, for example, serve as an 'absolute truth' and a document to be recorded in a PTR may be fetched from this distributed world state ledger. A world state ledger may, for example, facilitate a controller executing a set of program instructions to directly access a current value of a given state, rather than having to calculate it by traversing an entire transaction ledger. Ledger states may be, by default, expressed as key-value pairs. The world state may, for example, change frequently, as states are created, updated and deleted.

Furthermore, the Blockchain may be a transaction log that records all changes which have historically affected the world state of a record, up to the current state thereof. Transactions may be collected inside blocks that are appended to the blockchain, which may enable users to understand the history of changes that have resulted in the current world state. The data structure of the Blockchain may be very different to the world state Blockchain ledger because the Blockchain holding the transaction history is immutable: an entry therein cannot be modified once written; however, a world state Blockchain ledger may be repeatedly updated as various states change.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the memory can be supplemented by, or incorporated in hardware programmable devices, such as FPGAs, for example.

As described herein, the data store may generally include one or more data storage devices that tangibly contain at least a portion of the executable instructions that may be executed on one or more processors to perform the operations described herein.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. In some examples, various steps of operations may be optional or not required. In various implementations, various components or process steps may be combined or integrated with one another. Accordingly, other implementations are within the scope of the following claims.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A computer program product (CPP) embodied in a tangible information carrier, the CPP comprising:
    a data storage device configured to operably connect to a processor in a Certified Transaction Authority System (CTAS) and containing instructions that, when executed by the processor, cause the processor to perform operations to handle persistent transaction records (PTR) issued unilaterally by, and received from, a Certified Body, the operations comprising:
    (1) receive a Record message comprising parametric information defining a Certified Subject and a benefit to be conferred on the Certified Subject;
    (2) extract parameters that are necessary and sufficient to define the benefit from the Record message;
    (3) extract identifying information for the certified subject from the Record message;
    (4) retrieve a template defining a file-less data structure;
    (5) assemble the extracted parameters and the extracted identifying information for the certified subject into a file-less persistent transaction record (PTR) according to the retrieved template; and,
    (6) send the assembled PTR to a first blockchain manager with an instruction to record the PTR on a first blockchain.

2. The CPP of claim 1, wherein the operations further comprise extract, from the received request message, a transaction type associated with the benefit.

3. The CPP of claim 2, wherein the operations further comprise retrieving the template from the data store as a function of the extracted transaction type.

4. The CPP of claim 1, wherein the first blockchain is associated with, and configured to contain PTRs issued by, the Certified Body.

5. The CPP of claim 1, wherein the unilaterally granted benefit comprises a right conferred on the Certified Subject.

6. The CPP of claim 1, wherein the unilaterally granted benefit comprises a privilege conferred on the Certified Subject.

7. The CPP of claim 1, wherein the unilaterally granted benefit comprises a status conferred on the Certified Subject.

8. The CPP of claim 1, wherein the unilaterally granted benefit comprises a proof conferred on the Certified Subject.

9. The CPP of claim 1, wherein the operations further comprise:
   (7) receive formatting information associated with the benefit;
   (8) generate an electronic file configured to be displayed as a visual representation of a document displaying at least a portion of the parametric information; and,
   (9) send the document to the first blockchain manager with an instruction to record the document on the + in association with the PTR.

10. The CPP of claim 1, wherein the operations further comprise:
   (7) receive, from a Requestor, an electronic Request message packet requesting PTR information about the Certified Subject;
   (8) extract, from the electronic message packet, a Receiver to receive the PTR information;
   (9) extract, from the electronic Request message, identifying information for the certified subject;
   (10) retrieve the PTR from the first blockchain based on the identifying information for the certified subject; and,
   (11) assemble the PTR into a Retrieved PTR message.

11. The CPP of claim 10, wherein the operations further comprise:
   (12) receive formatting information associated with the benefit;
   (13) generate an electronic file configured to be displayed as a visual representation of a document displaying at least a portion of the parametric information;
   (14) send the document to the first blockchain manager with an instruction to record the document on the first blockchain in association with the PTR; and,
   (15) in response to receiving the electronic Request message packet, retrieve the recorded document from the first blockchain based on the identifying information for the Certified Subject.

12. The CPP of claim 11, wherein the received electronic Request message packet further comprises a visual representation request.

13. The CPP of claim 10, wherein the second blockchain is the first blockchain.

14. The CPP of claim 10, wherein the second blockchain manager is configured to control access to the Retrieved PTR message by the Receiver.

15. The CPP of claim 10, wherein the Receiver is the Requestor.

16. The CPP of claim 10, wherein the Requestor is the Certified Subject.

17. A Certified Transaction Authority System (CTAS) apparatus to handle storage and retrieval of unilateral benefits conferred on Certified Subjects by Certified Bodies, the apparatus comprising:
   a processor; and,
   a data storage device operably coupled to the processor and containing instructions that, when executed by the processor, cause the processor to perform operations to handle persistent transaction records (PTR) issued unilaterally by, and received from, a Certified Body, the operations comprising:
   (1) receive a Record message comprising parametric information defining a Certified Subject and a benefit to be conferred on the Certified Subject;
   (2) extract parameters that are necessary and sufficient to define the benefit from the Record message;
   (3) extract identifying information for the certified subject from the Record message;
   (4) retrieve a template defining a file-less data structure;
   (5) assemble the extracted parameters and the extracted identifying information for the certified subject into a file-less persistent transaction record (PTR) according to the retrieved template; and,
   (6) send the assembled PTR to a first blockchain manager with an instruction to record the PTR on a first blockchain.

18. The apparatus of claim 17, wherein the operations further comprise extract, from the received request message, a transaction type associated with the benefit.

19. The CPP of claim 18, wherein the operations further comprise retrieving the template from the data store as a function of the extracted transaction type.

20. The apparatus of claim 17, wherein the operations further comprise:
   (7) receive formatting information associated with the benefit;
   (8) generate an electronic file configured to be displayed as a visual representation of a document displaying at least a portion of the parametric information; and,
   (9) send the document to the first blockchain manager with an instruction to record the document on the first blockchain in association with the PTR.

* * * * *

UNITED STATES PATENT AND TRADEMARK OFFICE
CERTIFICATE OF CORRECTION

| | | |
|---|---|---|
| PATENT NO. | : 10,931,672 B1 | Page 1 of 1 |
| APPLICATION NO. | : 16/988148 | |
| DATED | : February 23, 2021 | |
| INVENTOR(S) | : Marcos V. Dequeiroga, Marcio C. Esteves and Tom Roesner | |

It is certified that error appears in the above-identified patent and that said Letters Patent is hereby corrected as shown below:

In the Specification

Column 3, Line 19, insert --to-- between "response" and "a".

Column 3, Line 39-41, insert --)-- between ")" and ".".

Column 3, Line 67, "contains" should read "contain".

Column 15, Line 16, delete ")" between "permits" and ".".

Column 17, Line 16, "." should read ",".

In the Claims

Column 21, Line 27, Claim 9, "+" should read "first blockchain".

Column 22, Line 4, Claim 13, "the second blockchain" should read "a second blockchain".

Column 22, Line 6, Claim 14, "the second" should read "a second".

Signed and Sealed this
Fifth Day of October, 2021

Drew Hirshfeld
*Performing the Functions and Duties of the
Under Secretary of Commerce for Intellectual Property and
Director of the United States Patent and Trademark Office*